(12) United States Patent
Hoch

(10) Patent No.: US 10,386,201 B2
(45) Date of Patent: Aug. 20, 2019

(54) DEVICE AND METHOD FOR CONTROLLING MOBILITY

(71) Applicant: VOLKSWAGEN AG, Wolfsburg (DE)

(72) Inventor: Nicklas Hoch, Hannover (DE)

(73) Assignee: Volkswagen AG (DE)

( * ) Notice: Subject to any disclaimer, the term of this patent is extended or adjusted under 35 U.S.C. 154(b) by 32 days.

(21) Appl. No.: 15/021,072

(22) PCT Filed: Sep. 10, 2014

(86) PCT No.: PCT/EP2014/069252
§ 371 (c)(1),
(2) Date: Mar. 10, 2016

(87) PCT Pub. No.: WO2015/036416
PCT Pub. Date: Mar. 19, 2015

(65) Prior Publication Data
US 2016/0231136 A1    Aug. 11, 2016

(30) Foreign Application Priority Data

Sep. 10, 2013    (DE) .................. 10 2013 218 046

(51) Int. Cl.
| | | |
|---|---|---|
| *G01C 21/36* | (2006.01) | |
| *G01C 21/34* | (2006.01) | |
| *G06Q 30/02* | (2012.01) | |
| *G07B 15/02* | (2011.01) | |

(52) U.S. Cl.
CPC ..... *G01C 21/3685* (2013.01); *G01C 21/3453* (2013.01); *G01C 21/3605* (2013.01); *G01C 21/3679* (2013.01); *G06Q 30/0284* (2013.01); *G07B 15/02* (2013.01); *G06Q 2240/00* (2013.01)

(58) Field of Classification Search
CPC ............ G01C 21/3453; G01C 21/3605; G01C 21/3685; G01C 21/3679; G07B 15/02; G06Q 2240/00; G06Q 30/0284
See application file for complete search history.

(56) References Cited

U.S. PATENT DOCUMENTS

| | | | |
|---|---|---|---|
| 6,411,895 B1 | 6/2002 | Lau et al. | |
| 2009/0312903 A1* | 12/2009 | Hafner ................ | B60L 8/003 701/36 |
| 2010/0198508 A1 | 8/2010 | Tang | |

(Continued)

FOREIGN PATENT DOCUMENTS

| | | |
|---|---|---|
| DE | 102004001820 A1 | 7/2004 |
| DE | 102005046840 A1 | 4/2007 |

(Continued)

OTHER PUBLICATIONS

Search Report for German Patent Application No. 10 2013 218 046.2; dated May 21, 2014.

(Continued)

*Primary Examiner* — Aaron L Troost
(74) *Attorney, Agent, or Firm* — Barnes & Thornburg LLP

(57) ABSTRACT

Methods and devices for controlling mobility in which a server arrangement determines the market prices for mobility resources. In devices associated with the vehicles, a route recommendation is then calculated based on market prices and a preference specified by the vehicle occupants.

14 Claims, 6 Drawing Sheets

(56) References Cited

U.S. PATENT DOCUMENTS

| | | | |
|---|---|---|---|
| 2011/0224899 A1 | 9/2011 | Mathews | |
| 2012/0226435 A1 | 9/2012 | Yuasa | |
| 2013/0046456 A1 | 2/2013 | Scofield et al. | |
| 2013/0339108 A1* | 12/2013 | Ryder | G06Q 10/02 705/14.1 |
| 2014/0129139 A1* | 5/2014 | Ellison | G01C 21/3469 701/533 |
| 2014/0188689 A1* | 7/2014 | Kalsi | H02J 3/00 705/37 |

FOREIGN PATENT DOCUMENTS

| | | |
|---|---|---|
| DE | 102006032374 A1 | 5/2007 |
| DE | 102006014024 A1 | 6/2007 |
| DE | 102006050096 A1 | 11/2007 |
| DE | 102007037329 A1 | 2/2008 |
| DE | 102008030070 A1 | 4/2009 |
| DE | 102009024528 A1 | 3/2010 |
| DE | 112009000257 T5 | 2/2011 |
| DE | 102011122191 A1 | 6/2012 |
| DE | 102011102911 A1 | 12/2012 |
| EP | 1255964 A1 | 11/2002 |
| EP | 2075546 A2 | 7/2009 |

OTHER PUBLICATIONS

Search Report for International Patent Application No. PCT/EP2014/069252; dated Jun. 29, 2015.

* cited by examiner

DEVICE AND METHOD FOR CONTROLLING MOBILITY

PRIORITY CLAIM

This patent application is a U.S. National Phase of International Patent Application No. PCT/EP2014/069252, filed 10 Sep. 2014, which claims priority to German Patent Application No. 10 2013 218 046.2, filed 10 Sep. 2013, the disclosures of which are incorporated herein by reference in their entirety.

FIELD

Illustrative embodiments relate to methods, apparatuses, server arrangements and systems for mobility control for vehicles, particularly for motor vehicles such as automobiles or trucks.

BACKGROUND

To assist drivers in trip planning, various technical tools, for example, navigation systems, are known that propose a route, for example, to the driver and lead him to a desired destination. Such systems are frequently designed only to find a best possible solution for the respective driver without taking account of needs of other road users. Generally, however, it is desirable to optimize trips for individual vehicles in complex traffic systems with limited resources. In this context, limited resources means that facilities of the traffic system can be used efficiently only by a limited number of vehicles. By way of example, queues arise when too many vehicles use a particular road, parking spaces are available only in a limited number, etc.

In this case, existing navigation solutions can take account of traffic information or parking space availabilities, for example, to compute a route from a starting location A to a destination B along a road network. This can involve taking account of different cost functions, such as the journey time or the energy consumption of the vehicle. Methods are also known that compute a route for a sequence of many desired destinations. Such methods can optimize an order for the destinations, for example, and/or take account of residence times and resource limitations, such as freight capacity. Furthermore, traffic management systems are known. In the case of such traffic management systems, a central coordination unit takes current traffic conditions as a basis for dynamically stipulating speed limits or traffic light phases, for example.

In the case of conventional solutions of this kind, the potential for improvement in comparison with a situation without such solutions is critically dependent on an equipment rate, i.e. on what proportion of vehicles uses the relevant solutions and is equipped with corresponding apparatuses. Thus, many of the conventional solutions attain great benefit, given an equipment rate of, by way of example, 25% of equipped vehicles, in comparison with unequipped vehicles. At higher equipment rates of 60% to 80%, for example, a contrary effect frequently arises, however, so that in this case equipped vehicles perform worse than unequipped vehicles. A higher resolution of available relevant information, for example in respect of traffic density and the like, can shift this negative effect toward higher equipment rates but cannot eliminate it. The reason is systemic, since the conventional solutions behave competitively toward other road users in respect of the available resources and only take account of the individual local point of view. At a low equipment rate, the information available to the systems provides them with an benefit over unequipped vehicles. However, if a large number of equipped vehicles uses the same information basis for planning and, by way of example, uses the same local cost function for optimization, global bottlenecks are generated, since, by way of example, all equipped vehicles use the same alternate route in the event of a queue. This gives rise to the aforementioned negative effect in comparison with unequipped vehicles.

On the other hand, central traffic management systems have the opportunity, from a global system perspective, to distribute resources efficiently overall. In so doing, however, they do not or barely take account of the effects of decisions on a trip quality for individual drivers. By way of example, the trip quality of individual drivers can be severely reduced for the benefit of the overall system response. In addition, implementation is complex in the case of large traffic systems and open system boundaries.

Illustrative embodiments provide methods and apparatuses for mobility control that can also be implemented in large traffic systems with relatively little outlay, but take account of both the global resource distribution and individual requirements of the drivers and that, if at all possible, involve equipped vehicles performing no worse than unequipped vehicles even given a higher degree of equipment.

Illustrative embodiments also relate to a system having such a server arrangement and at least one such apparatus for a vehicle and also to a vehicle equipped with such an apparatus.

BRIEF DESCRIPTION OF THE FIGURES

Disclosed embodiments are explained in more detail below with reference to the drawings, in which.

DETAILED DESCRIPTION OF THE DISCLOSED EMBODIMENTS

Figure 1:
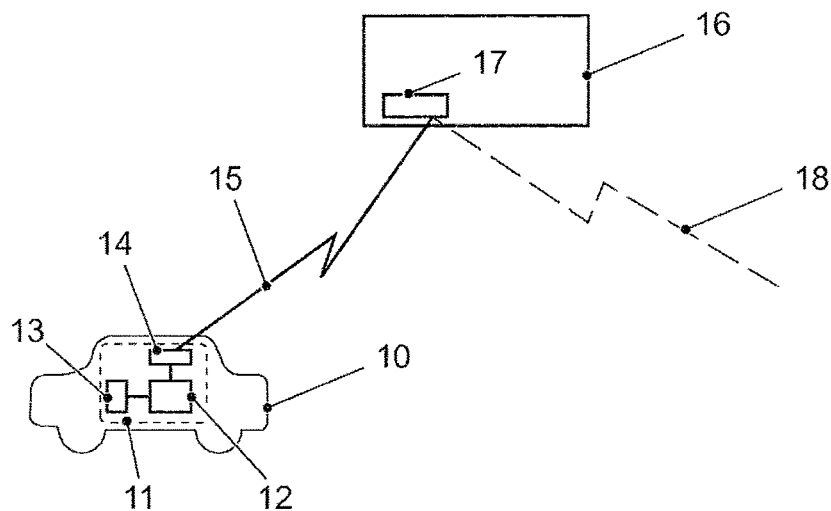
FIG. 1 shows a simple diagram of a system for mobility control according to at least one exemplary embodiment.

Disclosed embodiments provide a method for mobility control, comprising determination of market prices for mobility resources in a distributed or central server arrangement on the basis of a demand for the mobility resources, reception of at least one of the market prices from the server arrangement in an apparatus associated with a vehicle, stipulation of a preference by a user of the vehicle and determination of a route recommendation on the basis of the at least one received market price and the preference in the apparatus associated with the vehicle.

Such a method allows the determination of market prices to control the global interests and the resource distribution between road use's by taking account of demand. On the other hand, at the level of the vehicle, the stipulation of a preference by a user can take account of individual interests of the respective user of the vehicle. In addition, it is possible, since the route recommendation is determined in the apparatus associated with the vehicle, for the server arrangement to be relieved of load and to be simply scalable, since particularly the server arrangement does not have to take account of different users but rather merely needs to determine market prices on the basis of demand information and/or resource availabilities, which may be forecast demand information and/or resource availabilities. The apparatus associated with the vehicle may be provided in the vehicle or a backend of the vehicle, for example.

In this case, mobility resource is intended to be understood generally to mean a resource whose availability and/or whose costs is/are of interest for route planning. Examples of mobility resources are traffic routes, filling stations, charging columns for electric vehicles, parking spaces and the like. Market prices are generally intended to be understood to mean cost parameters that can be determined particularly on the basis of an availability of the respective mobility resource and/or costs of the respective mobility resource by the server arrangement. By way of example, the market price of a traffic route can increase when many vehicles use the respective traffic route, a market price for a parking space can be dependent on the costs of the parking space (parking fees) and/or the number of available (unoccupied) parking spaces etc. Even if the market price can include actual costs such as parking space costs, it should be noted that the market price is in this case used as a parameter for traffic control and optimum resource use and is therefore to a certain extent a parameter for rating mobility resources, particularly the availability thereof. Thus, the market price is in this case used primarily for traffic control, i.e. primarily serves a purpose that is not oriented to making profits and particularly not necessarily to maximizing profit for providers. In particular, it is not necessarily a real price to be paid.

The stipulation of the preference allows the user of the vehicle to include his own preferences in the determination of the route recommendation. In this case, the preference can be stipulated directly by a user input or even indirectly, e.g. by virtue of the preference being derived from a behavior of the driver. In the mathematical sense, the preference of a driver is intended to be understood to mean a cost function that allocates individual criteria a weighting. By way of example, drivers with a preference for cheap travel would have a high weighting for the criteria of parking costs and/or energy consumption. As a result of this weighting, the route recommendation would give preference to cheap or toll-free parking spaces and/or routes on which energy consumption is low. On the other hand, the same criteria may have a lower significance and hence weighting for other drivers. It could be more important to them to get to the destination quickly and/or to be able to park close to the destination, regardless of the associated monetary costs. Hence, it is possible to take account of the preferences of individual users.

To determine the market prices, the server arrangement can receive appropriate information about the mobility resources and the use thereof, for example from vehicles, traffic guidance systems, operators of parking spaces, operators of filling stations or charging columns for electric vehicles, etc. In this way, the market prices can comprehensively reflect a global point of view.

In particular, the server arrangement can receive demand information from vehicles in respect of a demand for a particular mobility resource, if need be in conjunction with a maximum accepted price that the respective vehicle would "pay" for use of the mobility resource. In this way, the server arrangement can then adjust the market price such that a utilization level for the mobility resources is optimized.

In this case, determination of the route recommendation can involve the use of particularly market prices for two or more different types of mobility resources, e.g. traffic routes and parking spaces, traffic routes and filling stations or charging columns, etc. In this way, multiple aspects can be taken into account together. In other words, in at least one exemplary embodiment, market prices for different mobility resources that are relevant for a planned journey are received, for example market prices for potentially usable traffic routes, market prices for parking spaces at the end of the traffic route, if need be market prices for charging stations or filling stations along the traffic routes, etc. It is also possible for different preferences to be stipulated for different types of mobility resources. In this way, the route recommendation can then determine many different aspects of the journey both from a global point of view using the market prices and from a local point of view based on the preferences of the user. In other words, different aspects such as parking space costs, utilization level of traffic routes, etc. are combined and taken into account together.

A disclosed server arrangement accordingly comprises a computation device for determining market prices for mobility resources on the basis of a demand and also a communication interface for transmitting the market prices to vehicles. The communication interface can also be used to receive information in respect of the mobility resources. In exemplary embodiments, the distributed or central server arrangement comprises a plurality of distributed devices, which can facilitate implementation. The multiple devices can then reciprocally interchange information and/or market prices. By way of example, different devices may be responsible for different geographical areas or for different types of mobility resources. In this case, a hierarchic breakdown on multiple levels is possible. A distributed implementation of this kind allows the server arrangement to be implemented efficiently and with relatively little outlay for the individual devices. Such a server arrangement can have particularly the server-end parts of the method described above implemented in it.

A corresponding apparatus for a vehicle, e.g., for installation in a vehicle or for a backend of a vehicle, comprises a communication interface for receiving at least one market price from a central or distributed server arrangement and for sending a demand information item, optionally in conjunction with an additional price parameter, to the central or distributed server arrangement, a user interface that can be used to stipulate a preference by a user of the vehicle directly or indirectly, and a computation device for determining a route recommendation on the basis of the at least one market price and the preference. Such an apparatus can be used to implement the vehicle-end processes of the method described above.

In summary, disclosed methods, apparatuses, server arrangements and systems can provide opportunities to use relatively little implementation outlay to take account of both global aspects and local requirements, wherein particularly a relatively high degree of equipped vehicles does not result in disadvantages for the equipped vehicles, since different preferences of users are taken into account and hence different vehicles can come to different route recommendations.

Exemplary embodiments are explained in detail below. It should be noted that these exemplary embodiments serve merely for illustration and are not intended to be interpreted as restrictive. While exemplary embodiments having a multiplicity of features and elements are described, it is not intended to be interpreted to mean that all of these features or elements are necessary. Rather, other exemplary embodiments may omit some of the represented features or elements and/or may have them replaced by alternative features or elements, and/or it is possible for additional features or elements to be provided. In addition, features or elements of different exemplary embodiments can be combined with one another unless indicated otherwise.

FIG. 1 schematically shows a diagram of a system for mobility control according to at least one exemplary embodiment. The system of FIG. 1 particularly comprises an apparatus 11, arranged in an equipped vehicle 10, according to at least one exemplary embodiment and a central server arrangement 16 according to at least one exemplary embodiment. The apparatus 11 comprises a communication interface 14, while the server arrangement 16 comprises a communication interface 17. The communication can take place in particular wirelessly, as indicated by a line 15, for example wirelessly via a mobile radio network such as a GSM network, a UMTS network or LTE network, or even using other conventional wireless communication techniques, for example. As indicated by a dashed line 18, the central server arrangement can also communicate with further units, particularly further vehicles or units that provide information. In particular, the central server arrangement 16 can use the communication interface 17 to receive information in respect of mobility resources, for example in respect of a utilization level of mobility resources such as parking spaces, traffic routes, charging columns for electric vehicles, etc., or even about costs of mobility resources such as parking fees, gas prices of filling stations, etc. Such information can be received from other central units, such as traffic guidance centers or even from appropriately equipped vehicles. In particular, the vehicles can send demand information in respect of a demand for mobility resources. Such demand information can, as will be explained later in even more detail, also contain an information item in respect of a maximum accepted price. As already explained above, the term "price", like the term "market price", is not necessarily intended to be understood in a monetary sense, but rather "market prices" or "prices" can serve as parameters for traffic control in exemplary embodiments. As will be explained later, the server arrangement 16 may have a computation device for combining the information and stipulating market prices.

The apparatus 11 of FIG. 1 additionally comprises a user interface 13 that a driver can use to input a preference in respect of the journey to be computed and hence also directly or indirectly in respect of the mobility resources. Examples thereof will be discussed later. In addition, the apparatus 11 has a computation device 12 that can be used to take the preference and to take one or more market prices that are received from the server arrangement 16 as a basis for determining a route recommendation and to output it via the user interface 13. It should be noted that the apparatus 11 may in this case be an apparatus that is also used for other purposes. By way of example, the functionalities described may be integrated in a navigation system or infotainment system of a vehicle.

Figure 2:
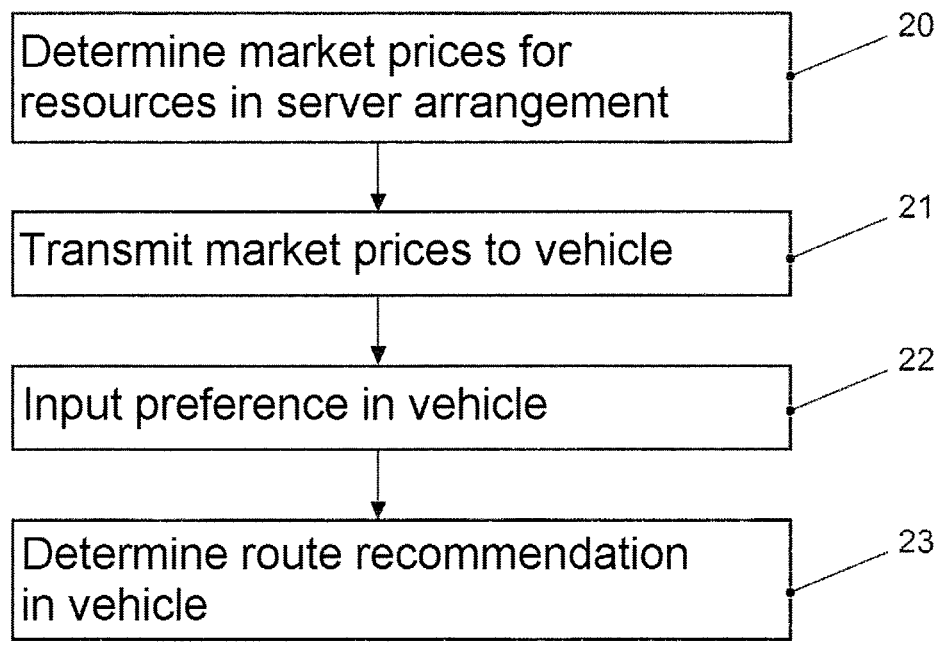
FIG. 2 shows a flowchart to illustrate a method according to at least one exemplary embodiment.

FIG. 2 shows a flowchart for a method according to at least one exemplary embodiment that is used to explain the manner of operation of the system of FIG. 1 again in somewhat more detail. In other words, the method of FIG. 2 may be implemented in the system of FIG. 1, but is not limited thereto and can also be implemented by means of other systems and apparatuses.

In 20, market prices for mobility resources such as traffic routes, parking spaces, charging columns, filling stations and the like are determined in a server arrangement such as the server arrangement 16 of FIG. 1 on the basis of a demand and optionally in conjunction with an additional price parameter. To this end, the server arrangement can obtain information in respect of the mobility resources. By way of example, a utilization level for the mobility resources, a demand for mobility resources or costs of the mobility resources can be communicated to determine the market prices on this basis. By way of example, a relatively high utilization level can increase the market price, while a relatively low utilization level can lower the market price. In the case of mobility resources that are subject to a fee, such as many parking spaces, the market price can correspond to the costs or be determined from a combination of the costs and the utilization level.

In 21, a market price or multiple market prices are transmitted to a vehicle, for example, the apparatus 11 of the vehicle 10 of FIG. 1, or to an external apparatus associated with the vehicle. This can be done particularly at the request of the vehicle.

In 22, a user, for example a driver, of the vehicle inputs a preference in respect of the journey criteria, for example using the user interface 13 of FIG. 1. By way of example, the driver can indicate that he prefers routes with lower energy consumption over faster routes, or vice versa, but he wishes to avoid route roads that are subject to a fee, such as toll roads, that he prefers cheap parking spaces that are further away from a destination over expensive parking spaces close to the destination, or vice versa, etc. The weighting of the criteria, i.e., the preference, can be input by the driver directly or derived indirectly, e.g. from what are known as travel choice experiments handled by the driver, or can even be derived from a driving behavior or travel behavior of the driver. In this case, travel choice experiments are methods for quantitatively determining a weighting vector for user preferences. Test subjects (e.g. a user such as a driver of a vehicle) are confronted with alternative decisions. The decision alternatives differ in terms of their parameter characteristics. The test subjects have to decide on one alternative. The decision of the test subjects is recorded. The parameter characteristics and the recorded test subject decisions are used to compute, e.g. by means of multinomial logit models, weighting parameters that, in the present case, describe the aforementioned preference of the user.

In 23, a route recommendation is then determined in the vehicle or the apparatus associated with the vehicle, for example, by means of the computation device 12 of FIG. 1, on the basis of the input preference and the transmitted market prices.

It should be noted that the different processes of FIG. 2 do not necessarily have to be performed in the order shown. By way of example, the preference can also be input before the market prices are transmitted to the vehicle. By way of example, a user can also input his preferences once, these preferences then being stored in the vehicle and remaining valid as long as the driver does not change his preferences. The determination of the market prices for resources in the server arrangement can take place progressively, for example, so that the market prices are continually updated, particularly are adjusted to suit a demand, the demand also being able to be a demand forecast. The market prices can be provided for the current time or a time in the future.

Figure 3:
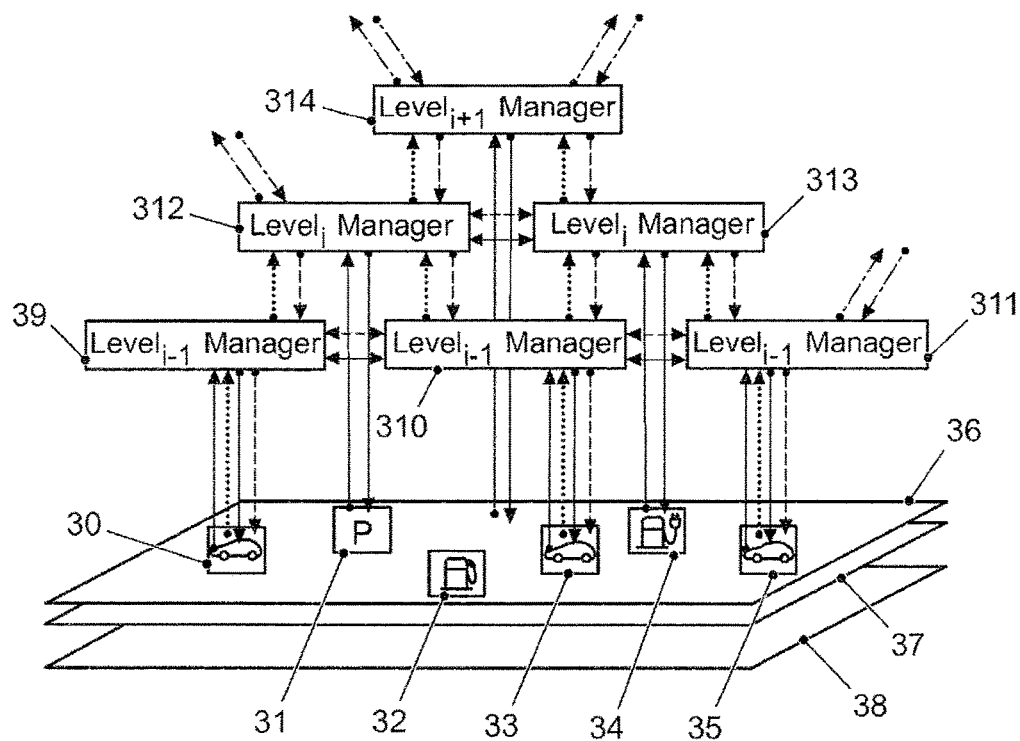
FIG. 3 shows a more detailed diagram of a system for mobility control according to at least one exemplary embodiment.
Figure 7:
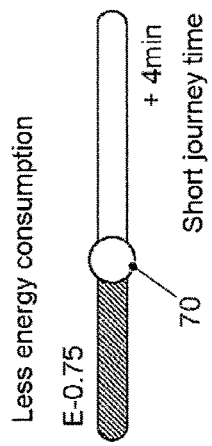
FIG. 7 shows an example of a user interface for inputting a preference.
Figure 8:
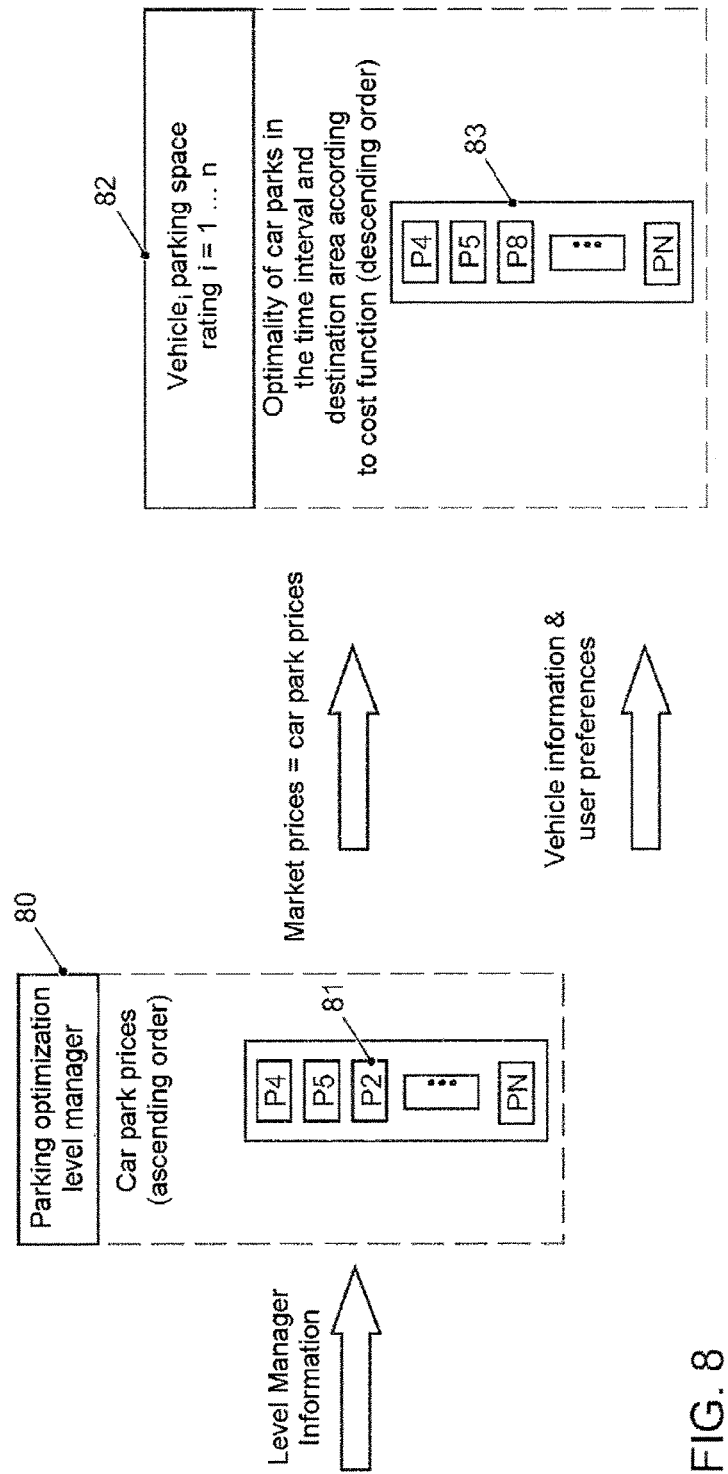
FIG. 8 shows a diagram to illustrate optimization of a parking space search according to at least one exemplary embodiment.
Figure 9:
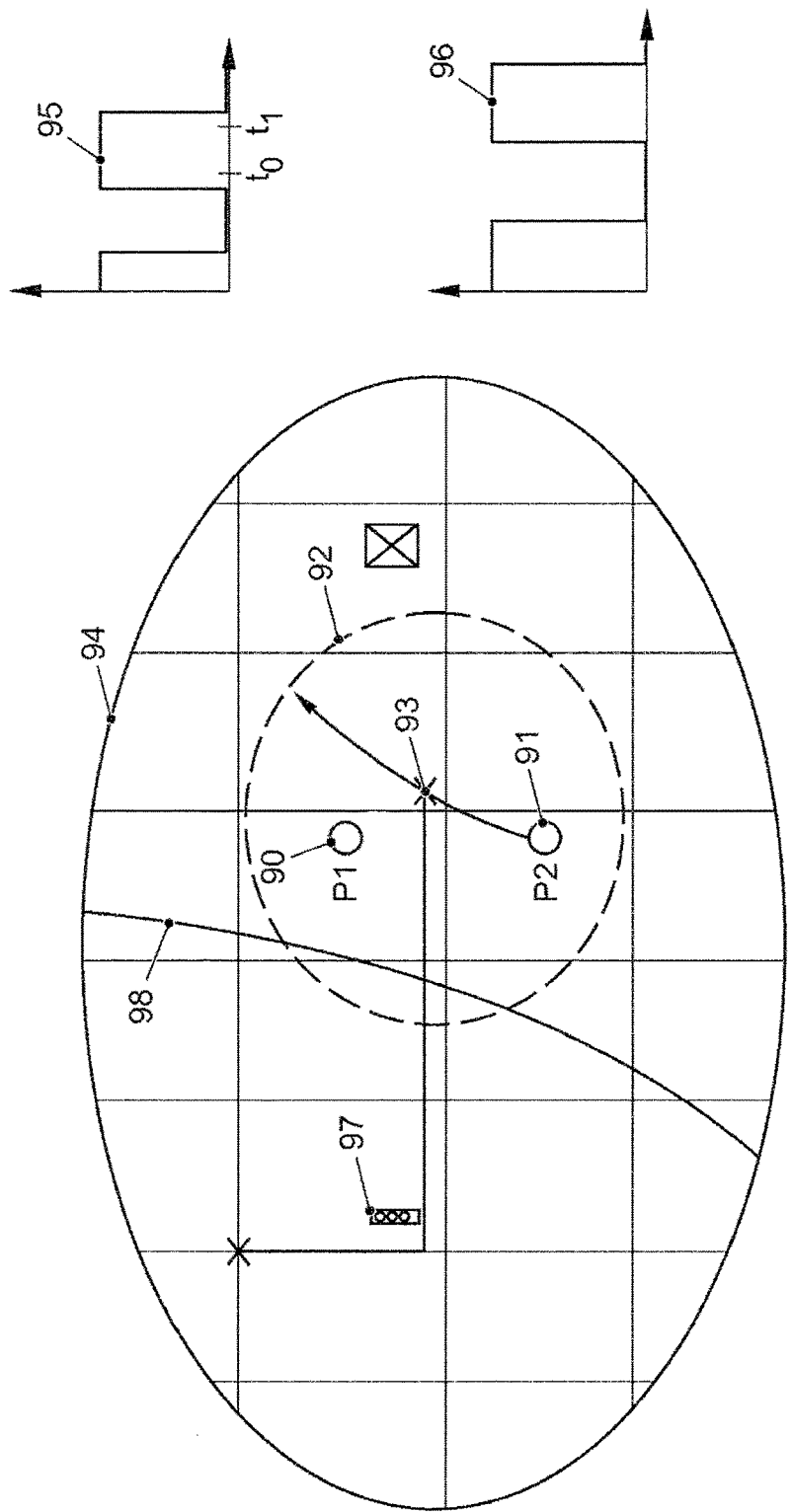
FIG. 9 shows a diagram to illustrate at least one exemplary embodiment for the parking space search.
Figure 10:
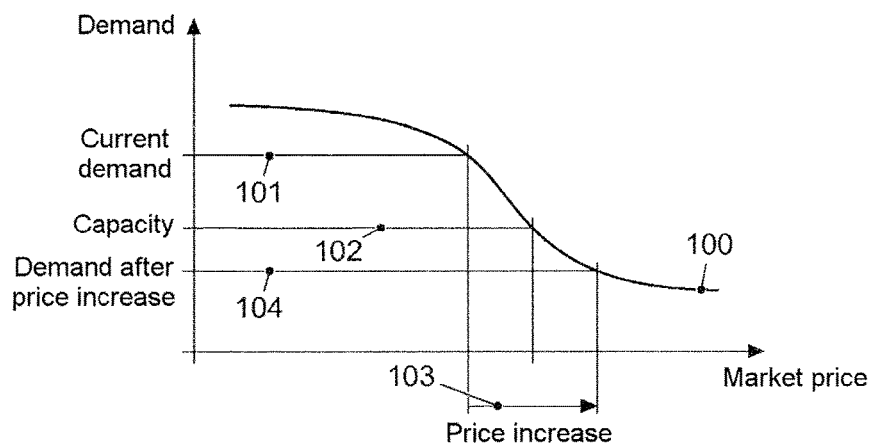
FIG. 10 shows a diagram to illustrate the stipulation of market prices on the basis of a demand.
Figure 11:
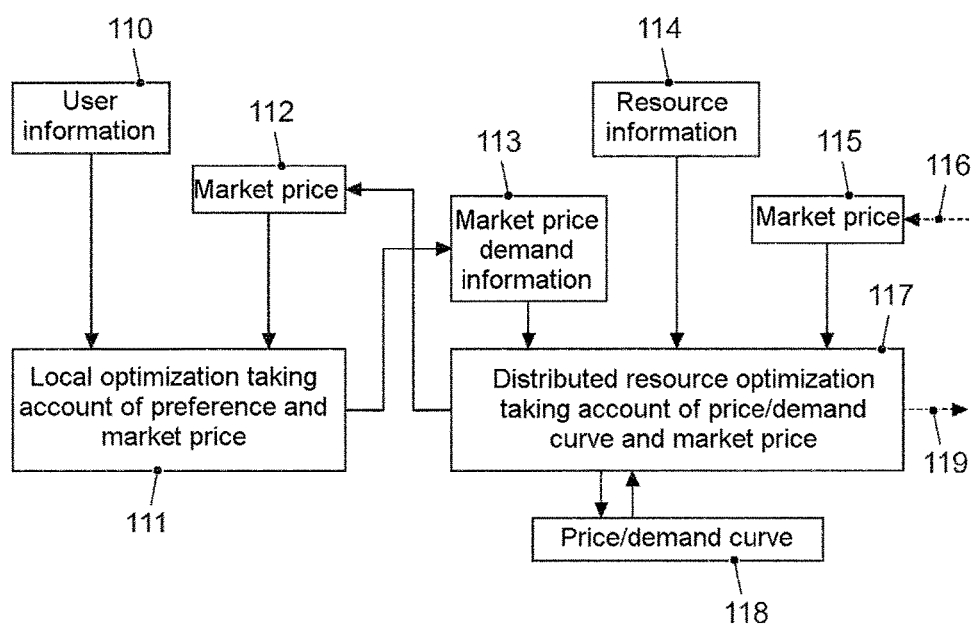
FIG. 11 shows a diagram to illustrate the manner of operation of some exemplary embodiments.

Further exemplary embodiments that describe more specific implementation options for the exemplary embodiments of FIGS. 1 and 2 and provide a more detailed explanation of options for implementing the various method steps of FIG. 2 will now be described below with reference to FIG. 3-11. In this case, FIG. 3 shows a block diagram of a system for mobility control according to at least one exemplary embodiment. Individual components of the system and also the communication of the components among one another are explained in more detail with reference to FIG. 4-6. Finally, FIGS. 7-9 show examples of special instances of application. FIGS. 10 and 11 explain the demand-based determination of market prices and a corresponding further exemplary embodiment.

The system of FIG. 3 comprises, as a server arrangement, a multiplicity of what are known as level managers 39 and 310-314 that are arranged hierarchically in levels. By way of example, the level managers 39, 310, 311 form a first level (level i-1), the level managers 312 and 313 form a second level (level i) and the level manager 314 forms a third level (level i+1). If necessary, further levels or fewer levels may be present. The number of level managers on each level can likewise vary. The allocation of the level managers can differ in terms of subject, time and/or locality. Different level managers may be responsible for different types of mobility resources and/or for different geographical areas, for example. The different level managers communicate with one another and with further devices. In this case, arrows with solid lines in FIG. 3 indicate an interchange with a physical network, i.e. obtainment and transfer of information about a network such as a road network or an energy network. Dashed arrows indicate an interchange of market prices, and dotted arrows denote an optional interchange of information that can be used, for example by vehicles 30, 33, 35, to communicate decisions about a choice of route that has been made or a parking space booking that has been made or demand information. Arrows with dash-dot lines indicate optional possible communication with further components (not shown).

By way of example, the level managers 39, 310, 311 on the bottommost level may, in the exemplary embodiment shown, each be responsible for a particular geographical area and determine market prices for this area and/or obtain them from level managers on a higher level and transmit these market prices to vehicles 30, 33 and 35 in their respective area. The level manager 312 on the second level can, by way of example, collect information about availability and prices of parking spaces 31 in a particular area and either determine market prices therefrom or transfer the relevant information to the level managers 39, 310, 311 on the first level, so that they can determine market prices. Similarly, the level manger 313 can, by way of example, collect information in respect of prices and occupancy of charging columns 34 for electric vehicles and, on the basis of the information obtained, stipulate market prices or transfer the relevant information to other level managers for the purpose of determining market prices. Similarly, a level manger can collect information in respect of conventional filling stations 32. Finally, the level manager 314 collects network-related information, for example about a road network 36 or an energy network 37, for example from traffic guidance centers or other providers that provide information in respect of the utilization level of traffic routes such as roads, or energy network operators in the case of the energy network 37, and in turn determines corresponding market prices for the relevant mobility resources therefrom. It should be noted that, in the exemplary embodiment of FIG. 3, level managers on a higher level can, by way of example, also compute market prices on the high level, e.g. area market prices, which can then be modified or recomputed by the level managers 39, 310, 311 on the first level, for example, on the basis of local circumstances, for example on the basis of information obtained from vehicles. Market prices on higher levels may be parameters that are used by level managers on subordinate levels to compute market prices.

In addition, the vehicles 30, 33 and 35 can also, given appropriate equipment, transmit relevant information for determining market prices to the level managers 39, 310 and 311. The vehicles 30, 33 and 35 physically interact with the road network, for example, as indicated by a level 38 for the physical interaction, and can transmit information resulting therefrom. By way of example, the vehicles can transmit information in respect of jams, or, given an appropriate number of equipped vehicles, it is possible for the number of vehicles itself to be an information item in respect of the utilization level.

The vehicles and the level managers communicate via information and communication technology networks, with different techniques such as mobile radio networks, WLAN, wired networks, etc., being able to be used.

It should be noted that the split for the level managers of FIG. 3 is merely intended to be understood as an example, and it is also possible for a single level manager to perform a plurality of the presented tasks, for example, so that it is also possible for fewer level managers or fewer levels of level managers to be in place, for example.

It should also be noted that some level managers can also be set up dynamically. By way of example, a device in a vehicle can serve as a level manager for a certain physical area, for example as a level manager on the first level of FIG. 3, so long as the vehicle is located in this area, and can thus supply the vehicle itself and also other vehicles in the area with market prices.

Figure 4:
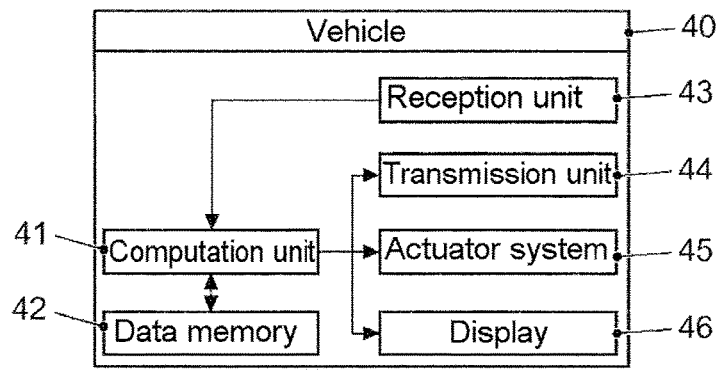
FIG. 4 shows a block diagram of an apparatus for a vehicle according to at least one exemplary embodiment.

As already explained with reference to FIGS. 1 and 2, the level managers, for example the level mangers 39, 310, 311 on the first level, notify the vehicles 30, 33, 35, on request, of market prices that the vehicles then use, together with preferences of a user, to determine a route recommendation. An example of a corresponding apparatus 40 in a vehicle is shown in FIG. 4. In this case, the apparatus 40 of the vehicle comprises a computation unit 41 that can use a reception unit 43 to receive market prices from the level managers, for example, and can use a transmission unit 44 to send information to the level managers. The computation unit 41 is coupled to a data memory 42. The data memory 42 can store preferences of a user, for example, that the user has set or that have been automatically computed indirectly on the basis of his behavior. The computation unit 41 can then take the market prices received via the reception unit 43 as a basis, and can take the preferences as a basis, for determining a route recommendation for a destination that a user requires and can output it via a display 46. The computation unit 41 can also be used for further purposes, for example it can act on an actuating system 45, for example gear box, engine, etc., of the vehicle, and control it. In other words, the computation unit or the apparatus 40 can also be used for purposes other than for determining route recommendations. By way of example, components such as the computation unit 41 may be part of an infotainment system or a control device of the vehicle.

It should be noted that, in the case of some exemplary embodiments, the apparatus 40 may also be implemented outside the vehicle, for example in a vehicle backend associated with the respective vehicle, for example by means of what is known as back2car communication. In this case, such a vehicle backend is an apparatus associated with the vehicle.

Figure 5:
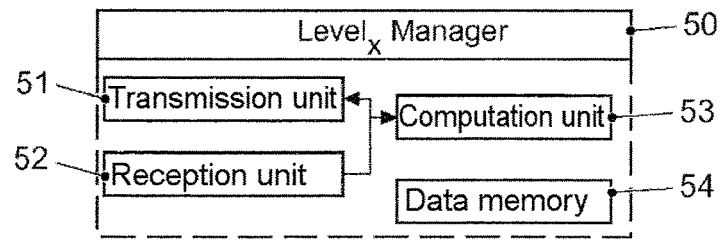
FIG. 5 shows a block diagram of a level manager of a server arrangement according to at least one exemplary embodiment.

FIG. 5 shows an example of the implementation of a level manager 50 according to at least one exemplary embodiment. By way of example, the level manager 50 can reflect an implementation of one or more of the level managers 39, 310-314 of FIG. 3. It should be noted that the different level managers of FIG. 3 do not all have to be implemented in the same way, but rather different hardware components can be used, for example.

The level manager 50 in the exemplary embodiment of FIG. 5 comprises a transmission unit 51 and a reception unit 52, for example, to be able to perform a data interchange described with reference to FIG. 3.

The transmission unit 51 and the reception unit 52 are connected to a computation unit 53 that can perform a computation of the market prices. Market prices and also information on the basis of which the market prices can be computed can, like other data, be stored in a data memory 54 associated with the computation unit 53.

Figure 6:
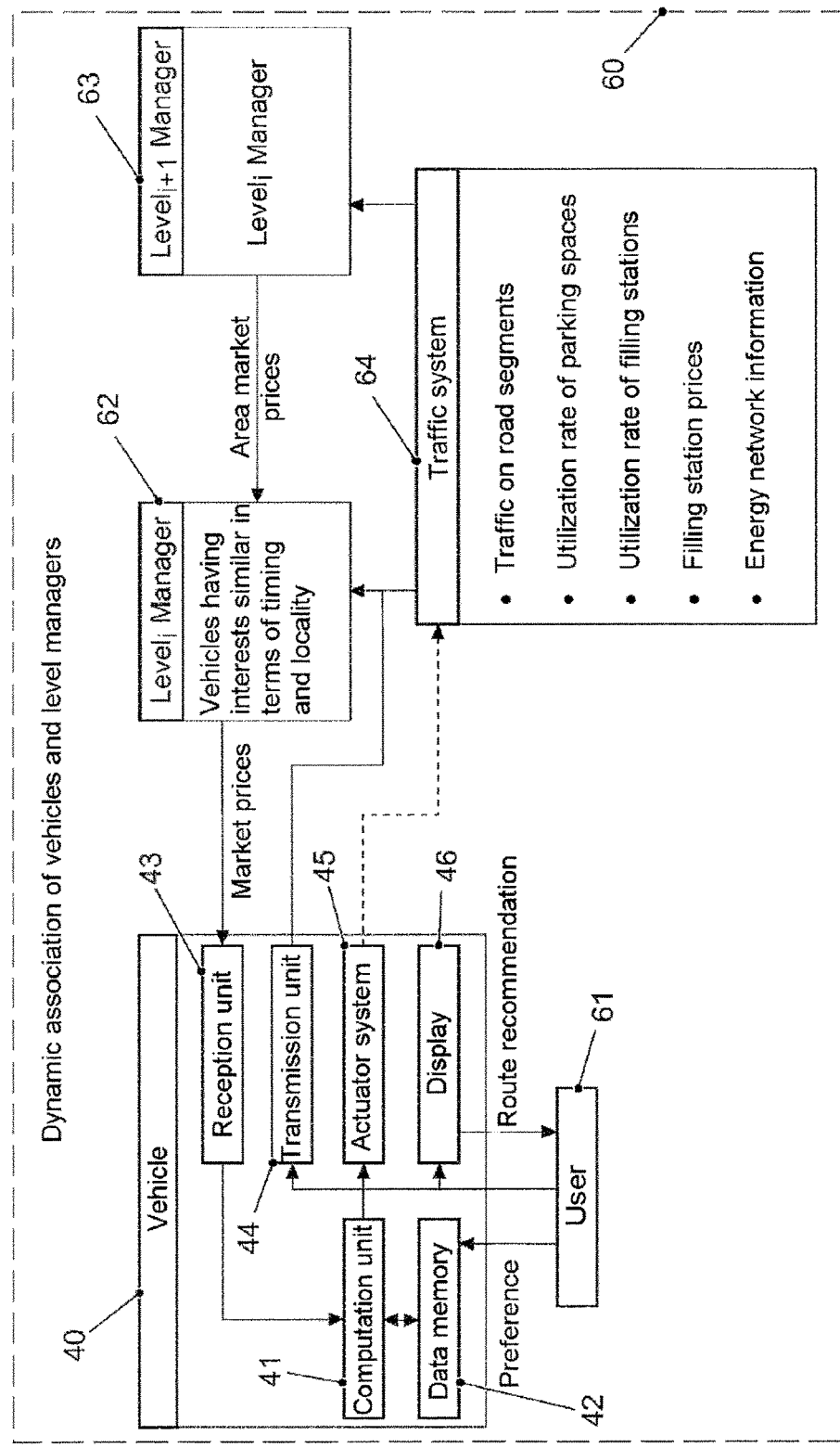
FIG. 6 shows a diagram to illustrate communication between an apparatus in a vehicle, a server arrangement and further components.

FIG. 6 shows the interaction described with reference to FIG. 3 between level managers and vehicle in a system 60 once again in more detail. In this case, an apparatus 40 that is shown in a vehicle corresponds to the apparatus already discussed with reference to FIG. 4 and is therefore not explained in more detail. For the system 60 of FIG. 6, a level manager 62 on a first level and a level manager 63 on a second level are shown. By way of example, the level manager 62 can correspond to one of the level managers 39, 310, 311 of FIG. 3, and the apparatus 40 may be installed in a corresponding vehicle 30, 33 or 35. The level manager 62 forwards market prices to the apparatus 40 or generally to vehicles having interests that are similar in terms of time, subject and/or locality, for example vehicles in a prescribed area of the level manager 62. For this purpose, the level manager 62 obtains area market prices for a larger area, for example from the level manager 63, which can correspond to one of the level managers 312, 313. The level manager 62 then takes these area market prices and if need be local information as a basis for computing the market prices that are forwarded to the apparatus 40. For the purpose of computing the market prices or the area market prices, the level managers 62, 63 obtain information about the traffic system 64, for example about traffic on road segments and traffic routes, about a utilization rate for parking spaces, a utilization rate for filling stations, filling station prices, energy network information, other demand information and the like, as explained above. As likewise explained, the level managers, particularly level manager 62, can also obtain information from vehicles. In addition, the apparatus 40 receives a preference from a user 61 as already explained and then uses the display 46 to output a route recommendation to the user 61.

An example of the direct input of such a preference is shown in FIG. 7. In this case, a slide control 70, which may be a physical slide control or a slide control presented on a touch screen, for example, can be used to specify whether low energy consumption or a short journey time is important to the user, that is to say to specify a weighting between opposite criteria of the cost function. In this case, as indicated in FIG. 7, the user can be notified of an assessment of how the present setting affects costs and journey time. In the case of the position of the slide control 70 that is shown in FIG. 7, greater value is placed on energy consumption, for example, which, in the example shown, would lead to a cost saving of roughly 0.75 Euros over a central position of the slide control and a forecast journey time increased by 4 minutes for example. In the same way, it is possible to perform weighting between costs of a parking space and the distance of the parking space from a desired destination, for example, or between fuel costs and a detour that would be necessary to drive to a respective filling station or charging column. Naturally, input options other than a slide control are also possible, e.g. input using keys or a rotary control. In addition, indirect input of the weightings is possible, e.g. by dint of the handling of travel choice experiments by the user and the automated evaluation of a relative weighting of the cost function criteria by a computation unit.

The computation of the market prices and also the computation of the route recommendation will be explained in somewhat more detail below. In the case of at least one exemplary embodiment, the route recommendation describes the optimum combination of travel decisions for a trip by a user from a starting location to a destination. Travel decisions are choice of parking space, choice of the departure time, choice of a charging column or a filling station, or choice of a route, for example. The optimization problem for the computation of optimum travel decisions is described by optimization parameters. Optimization parameters have characteristics. The set of possible characteristics is referred to as a set of values for the optimization parameters. Optimization parameters are the energy consumption along a route, the journey time along a route, the costs of a parking space or the energy or gas prices, for example. A solution space for the optimization problem, i.e. a set of all the possible solutions, describes all the combinations of these optimization parameters that satisfy prescribed constraints (where in place), for example as late as possible arrival time at the destination or an availability of a parking space, that may be prescribed by the user or even may be prescribed by the system. In other words, the solution space contains all the possible combinations of route, charging columns or filling stations to be driven to when going down the route, the parking space to be driven to during the route or at the end of the route, or the like, that satisfy the constraints. In the case of at least one exemplary embodiment, a cost function is then used to compute costs for the elements of the solution space, i.e. the different combinations of optimization parameters. In this case, a cost function takes account of personal preferences of a user, e.g. driver, of the vehicle, for example the weighting of journey time and energy consumption or distance to a destination on foot and parking costs, as explained above. It additionally takes account of at least one market price obtained from a level manager or another server arrangement for one or more of the resources that can be expressed by the optimization parameters. The market prices can likewise be computed on the basis of an optimization task, which is explained in more detail further below.

First, the optimization of the travel decision of individual users, i.e. the determination of the route recommendation according to at least one exemplary embodiment, will now be discussed. As already explained, the user can in this case use a user interface to set some or multiple preferences. In the case of at least one exemplary embodiment, the route recommendation can be determined by using a cost function of the following type:

$$\text{Costs} = \sum_{k=0}^{n} a_k f_k$$

where n describes the number of cost function terms, the $a_k$ are constant weighting terms and $f_k$ are arbitrary functions. In this case, the parameters of the optimization problem are individual or multiple weighted optimization parameters for the trip planning as explained above. The solution to the optimization problem describes the preferred decision of the user in respect of one or more decision dimensions, for example choice of parking space, choice of route or choice of charging column. The weighted cost function terms $a_k f_k$ then accordingly describe weighted parking costs, for example, on the basis of the choice of parking space, weighted journey time and journey costs for a particular route, weighted charging costs, or a weighted distance on foot from a chosen parking space to a destination. Hence, the possible solutions of the aforementioned solution space, which are described by all the possible combinations of the optimization parameters, are computed by means of conventional methods and rated in respect of their costs. At least one optimization parameter for the optimization problem is influenced via market prices. By way of example, certain routes can have market prices depending on utilization level, or parking spaces can have market prices depending on the utilization level of the parking space or costs of the parking space. The optimum solution, i.e. the determined route recommendation, can be obtained by minimizing or maximizing the above cost function. This then corresponds to a route for which the preferences of the user are met to the maximum extent taking account of the market prices. In this way, the computed route recommendation meets both the needs of the user and the global point of view, i.e. the requirement for available resources to be utilized as well as possible.

Similarly, the market prices can be ascertained by dint of optimization of resource costs by the level manager(s) or other server arrangements. In this case too, a cost function of the type $$\text{Costs} = \sum_{k=0}^{n} a_k f_k$$

can be used, where n again describes a number of cost function terms, a is a constant weighting term and f describes an arbitrary function.

In this case, the optimization parameters for this optimization problem are individual or multiple market prices such as parking costs or charging costs and possible further parameters of vehicles or other level managers, for example the area market prices mentioned with reference to FIG. 6, which are obtained from a level manager on a higher level.

The cost function terms describe weighted resource costs, such as a parking space equipment level (for example denoted by a number of parking space demands per parking space and unit time) or a weighted road utilization level (for example the number of vehicles per road segment and unit time). In the case of parking spaces, it is possible to include not only the parking space demands, for example, but also the parking fees as a further cost function term to compute a market price for a particular parking space. For roads too, it is possible to include, by way of example, road charges such as toll charges in addition to a road utilization level as a cost function term. It is also possible to compute a market price by combining different parameters such as parking space equipment level and road utilization level, for example, to take account of both utilization level of parking spaces and the utilization level of access roads to the respective parking space. The solution space is again described by all the possible combinations of the optimization parameters, with solutions again being able to be computed by means of conventional methods and rated in respect of their costs. An optimum solution again minimizes or maximizes the cost function indicated above, and the costs optimized in this manner then correspond to a market price, for example, that contributes to good coordination of supply and demand, for example.

Such an approach can thus use the market prices to take account of a resource availability for the traffic infrastructure, for example whether the resource availability is locally and/or temporarily lower than the demand (in this case the market prices are rising) or lower than the demand (in this case the market prices are falling) to direct the traffic such that queues, parking space shortages, etc., are avoided or reduced so as to improve the trip quality of users of the system. In this case, as described above, a distributed solution is employed, with market prices being produced by a server arrangement, which can consist of multiple distributed units, and the individual trip planning, i.e. the computation of the route recommendation, being effected at the level of the vehicle by taking account of preferences of a user and also of the market prices.

Such systems can be used to achieve particularly an optimized trip quality for individual drivers in respect of their respective cost function and to improve traffic constraints, with the network, which is shown in FIG. 3, being subjected to comparatively low load, since the level managers only determine the market prices and the actual determination of the route recommendation and also the taking account of the preferences take place in the vehicle or an apparatus associated with the vehicles, for example a backend.

In addition, examples of the manner of operation of exemplary embodiments for parking optimization, i.e. for guidance to an optimum parking space, will now be discussed with reference to FIGS. 8 and 9.

In FIG. 8, a level manager 80 for a parking optimization, for example, obtains information in respect of parking spaces, for example parking fees or occupancy of the parking spaces, and determines therefrom car park prices (market prices) 81, which are shown in ascending order, i.e. P4 is the most favorable car park in the example shown, for example owing to low parking fees and/or a large number of vacant parking spaces, whereas PN is the least favorable car park. These car park prices are communicated as market prices to an apparatus 82 associated with a vehicle. The apparatus 82 additionally obtains vehicle information, for example a desired destination, and user preferences. From this information, the aforementioned cost function is used to determine an order for the optimality of the car parks, which is denoted by 83 in FIG. 8. In this example, the car park P5 is rated as more optimum than the car park P4, for example, even though the car parks P4 has a lower market price. By way of example, the reason for this may be that the user does not wish to walk too far and the car park P5 is closer to the desired destination. For another user, the order of the car parks may have a different appearance again, and for similar destinations the car parks P4 and P5 will probably tend to be rated as optimum, owing to the market prices, more frequently than the car park PN, for example, which has the highest market price.

FIG. 9 shows, as a further example, a situation with two parking spaces 90 (also referred to as P1) and 91 (also referred to as P2), which are both situated in an area 92 around a desired destination 93 and are situated in a larger area 94. A boundary with respect to another part of the larger area 94 is denoted by 98. 97 denotes a set of traffic lights, particularly a variably controllable set of traffic lights, on an access road to the parking spaces 90 and 91.

A curve 95 shows an occupancy of the parking space 90, and a curve 96 shows an occupancy of the parking space 91. Hence, the parking spaces are occupied to a greater or lesser extent at different times. According to the utilization level, the market prices of the parking spaces 90 and 91 can vary over time. A first level manager may be responsible for stipulating market prices for the parking spaces 90 and 91, for example. A further level manager can monitor the utilization level of access roads to the parking spaces 90 and 91 and stipulate market prices for the latter, for example an access road on which there is the set of traffic lights 97. In this case, the further level manager can also control the set of traffic lights 97, for example, e.g. can change it to red for longer when the utilization level of the access road is high (which may be e.g. simultaneously linked to an increase in the market price for the access road). When the market price of the access road is low and the market price of the parking space 90 is low, it is then possible, by way of example, for a route recommendation to be to drive to the parking space 90 via the access road at the set of traffic lights 97, whereas when the market prices for the access road and the parking space 90 are higher, it is possible, by way of example, for a route recommendation to be to drive to the parking space 91 via a detour that is not routed via the set of traffic lights 97. For other preferences of a driver, a route recommendation may also be to drive to other, possibly cheaper, parking spaces in the area on the far side of the boundary 98.

It should be noted that FIGS. 8 and 9 serve only as an example for a better understanding of the exemplary embodiment shown and are not intended to be interpreted as restrictive. As already explained, the application of the exemplary embodiments is not limited to searching for parking spaces and, in particular, different aspects of trip planning such as choice of route, choice of parking space, etc., can be taken into account in combination, but can also be handled individually.

Finally, the determination of market prices on the basis of a demand and also the optimization of the use of mobility resources taking account of market prices determined in this manner will now be explained in more detail with reference to FIGS. 10 and 11.

In FIG. 10, a curve 100 shows an example of a dependency of a demand for a mobility resource on a market price. As illustrated by a curve 100, the demand falls when the market price rises. A point of intersection between the curve 100 and a vertical line 102 denotes, as an example, a capacity of the mobility resource, for example a holding capability of a road without queue formation or a number of parking spaces or charging stations or gas pumps at a filling station. In addition, FIG. 10 shows a vertical line 101, which, as an example, denotes a present market price and, at the point of intersection with the curve 100, a correspondingly present demand. In the example shown, the present demand is above the capacity of the mobility resource. Therefore, in the case of at least one exemplary embodiment, as indicated by an arrow 103, the market price has its price increase to a new price, which is denoted by a vertical line 104. As a result, the demand for the mobility resource falls such that the capacity of the mobility resource is sufficient to meet the demand. In this way, it is therefore possible to achieve control of traffic streams, for example. It should be mentioned that the demand can correspond to a current demand or may be a forecast demand for a time in the future. It should also be mentioned that the curve 100 can be ascertained on the basis of described vehicle information, such as a demand information item and possibly an additional price parameter, or may have been learned on the basis of historical information or may have been computed by means of simulation.

As already explained, in exemplary embodiments, vehicles can send demand information to the server arrangement, the demand information being able to contain a maximum acceptable price as an additional price parameter. In exemplary embodiments in which the server arrangement has such information available, the market price can be adjusted relatively exactly on the basis of the maximum acceptable prices for vehicles creating demand, which means that utilization of the mobility resource that is as optimum as possible is attained. In other cases, the price increase can be affected on the basis of empirical values or in steps, for example, to approach a utilization level that is as optimum as possible.

FIG. 11 shows a more detailed explanation of the manner of operation of exemplary embodiments by taking account of a price/demand curve such as the curve 100 in FIG. 10.

As already explained for the previous exemplary embodiments, this firstly involves resource optimization, for example by distributed servers, taking place, the servers stipulating a market price. This is shown in FIG. 11 by a block 117. Secondly, local optimization taking account of preferences of the driver takes place, for example in a vehicle or in an external apparatus associated with the vehicle. This local optimization is represented in FIG. 11 by a block 111.

In this case, as already explained, the local optimization is effected on the basis of a market price 112 and user information 110, particularly information in respect of preferences of the user, for example a driver.

In addition, the vehicle or an external apparatus associated with the vehicle sends market price demand information 113 to the server arrangement. By way of example, as explained with reference to FIG. 10, this information can comprise firstly information in respect of the demand for particular mobility resources and secondly information in respect of a maximum accepted price for the mobility resources.

The server arrangement then adapts market prices on the basis of the information 113, on the basis of resource information 114, for example information about capacity or car park prices, information about utilization level of traffic routes, etc., and/or on the basis of a previous market price or an area market price 115 that, as decreed by an arrow 116, can be obtained from a server arrangement on a higher level (cf. FIG. 3). In addition, in the case of the exemplary embodiment of FIG. 11, a price/demand curve 118 (for example the curve 100 of FIG. 10) serves as a basis for the adjustment and stipulation of market prices. In this way, the "global" point of view can be taken into account in the server arrangement as decreed by the block 117, i.e. a resource utilization level that is as optimum as possible can be taken as a guideline, while the local needs of the driver can be taken into account in the vehicle or an apparatus associated with the vehicle as indicated by the block 111. An arrow 119 indicates that information from block 117 can also be forwarded to further devices, e.g. server arrangements on a higher level.

It should be noted that the concepts and approaches discussed here can be applied not only to mobility systems, but rather are generally applicable in cases in which firstly global interests need to be taken into account and secondly local preferences are an issue. An example in this regard is combined heat and power plants, where global interests of the energy suppliers and also local interests of the individual combined heat and power plant operators or block-type power plants themselves (for example overheating) need to be taken into account.

DE 10 2011 122 191 A1 and DE 10 2006 014 024 A1 disclose parking guidance systems in which vacant parking spaces and/or probably vacant parking spaces are recorded in a central system. A vehicle can additionally notify the central system of a preference of a driver, for example in respect of a position or price of a desired parking space, whereupon the system then transmits to the vehicle data for a parking space to be driven to. However, this central computation firstly has problems in respect of data protection and secondly is increasingly difficult to implement as the system size increases, since the central system needs to compute a suitable parking space for each inquiry.

By contrast, DE 10 2006 032 374 A1 discloses a purely distributed network that can be formed by vehicle communication devices. In this case, a vehicle can make an inquiry after a particular resource, for example after a parking space, to other vehicles. Such a system is not suitable for global mobility control, but rather can merely assist single vehicles in quickly finding a required resource.

DE 2004 001 820 A1 discloses a navigation system in which the navigation system can procure information from the internet, for example, which information is then used for a route recommendation. By way of example, such information can comprise fee information for the use of a facility, a parking fee and the like.

Finally, EP 1 255 964 B1 discloses a navigation system in which supplementary information such as opening times or tariffs is stored on a storage medium for special destinations such as filling stations, post houses or parking garages. This supplementary information can be used by the navigation system for route planning, so that, instead of a closest special destination that is closed, however, one that is further away but open is chosen, for example. Such a system cannot take account of dynamically changing resource uses, however.

DE 10 2006 050 096 A1 discloses a navigation system that takes account of fuel prices and user preferences. This system is a unilateral control system. There is no feedback provided by the vehicle, for example to filling station operators.

LIST OF REFERENCE SYMBOLS

10 Vehicle
11 Apparatus
12 Computation device
13 User interface
14 Communication interface
15 Communication
16 Central server arrangement
17 Communication interface
18 Communication
20-23 Method steps
30 Vehicle
31 Parking spaces
32 Filling stations
33 Vehicle
34 Charging columns
35 Vehicle
36 Road network
37 Energy network
38 Level of physical interaction
39-314 Level manager
40 Apparatus
41 Computation unit
42 Data memory
43 Reception unit
44 Transmission unit
45 Actuator system
46 Display
50 Level manager
51 Transmission unit
52 Reception unit
53 Computation unit
54 Data memory
60 System
61 User
62 Level manager
63 Level manager
64 Traffic system
70 Slide control
80 Parking optimization level manager
82 Parking space rating in the vehicle
90 Parking space
91 Parking space
92 Area
93 Destination
94 Area
95 Parking space availability
96 Parking space availability
97 Set of traffic lights
98 Area boundary
100 Price/demand curve
101 Present demand
102 Capacity
103 Price increase
104 Demand after price increase
110 User information
111 Local optimization
112 Market price
113 Market price demand information
114 Resource information
115 Market price
116 Arrow
117 Distributed resource optimization
118 Price/demand curve

The invention claimed is:

1. A method for transportation vehicle route determination, comprising:
determining, in a remote server arrangement, market prices for mobility resources based on a demand for the mobility resources;
receiving, by the transportation vehicle, at least one of the market prices from the remote server arrangement;
stipulating a preference by a user of the transportation vehicle; and
determining, by the transportation vehicle, a route recommendation based on the at least one received market price and the preference in the apparatus associated with the vehicle, wherein the route recommendation is determined based on market prices for at least two different types of mobility resources selected from a group comprising traffic routes, traffic route segments, parking spaces, filling stations, and charging columns,
wherein the determining of the market prices comprises determination of area market prices by devices on a server level arranged above a bottommost server level within an area based on at least one resource selection regarding choice of route of a user received from at least one other vehicle, and determination of the market prices on the bottommost server level as local optimization based on a utilization level of the mobility resources and a cost of the mobility resources as local information.

2. The method of claim 1, wherein the stipulation of a preference comprises an instance of weighting optimization parameters.

3. The method of claim 1, further comprising receiving information about the mobility resources by the remote server, wherein the determination of market prices comprises an instance of determination of the market prices based on the received information.

4. The method of claim 1, wherein an apparatus associated with the transportation vehicle for communication with the remote server is arranged in the transportation vehicle.

5. The method of claim 1, further comprising an instance of reception of demand information from the apparatus associated with the transportation vehicle.

6. The method of claim 5, wherein the demand information comprises information relative to a maximum accepted price.

7. The method of claim 1, wherein the market prices are determined by modifying or recomputing the area market prices based on local circumstances.

8. The method of claim 7, wherein the local circumstances include information obtained from transportation vehicles.

9. A server arrangement for assisting determination of route recommendations for transportation vehicles, comprising:
   a communication interface for receiving information about mobility resources comprising information relative to a demand for the mobility resources and for sending market prices from mobility resources to apparatuses associated with vehicles;
   a computation device for computing the market prices based on the information received by the communication interface; and
   a multiplicity of devices arranged on different levels adapted to interchange information that is relevant to market prices with one another,
wherein devices on a bottommost level are set up to send market prices to apparatuses associated with transportation vehicles,
wherein devices on a further level, which is arranged above the bottommost level, are set up to receive information relative to availability of parking spaces, filling stations, and/or charging stations, and to determine area market prices based on the received information, and
wherein devices on the bottommost level receive the area market prices from devices on the further level and determine the market prices based on the area market prices and at least one resource selection of a user received from at least one transportation vehicle regarding choice of route.

10. The server arrangement of claim 9, wherein devices on an additional level arranged above the bottommost level, are set up to receive information relative to the utilization level of traffic routes and/or relative to an energy network.

11. The server arrangement of claim 9, wherein the information about mobility resources comprises information about maximum prices accepted for the mobility resources by road users.

12. The server arrangement of claim 9, wherein the at least one level includes a computation unit for computing market prices.

13. The server arrangement of claim 9, wherein the market prices are determined by modifying or recomputing area market prices based on local circumstances.

14. The server arrangement claim 13, wherein the local circumstances include information obtained from transportation vehicles.

* * * * *